(12) United States Patent
Wang

(10) Patent No.: US 10,461,854 B2
(45) Date of Patent: Oct. 29, 2019

(54) OPTICAL CIRCULATOR FOR FREE SPACE OPTICAL COMMUNICATION

(71) Applicant: X Development LLC, Mountain View, CA (US)

(72) Inventor: Chiachi Wang, Union City, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 16/055,801

(22) Filed: Aug. 6, 2018

(65) Prior Publication Data

US 2018/0375575 A1 Dec. 27, 2018

Related U.S. Application Data

(63) Continuation of application No. 15/290,153, filed on Oct. 11, 2016, now Pat. No. 10,069,562.

(51) Int. Cl.
| | | |
|---|---|---|
| *H04B 10/11* | (2013.01) | |
| *H04B 10/2581* | (2013.01) | |
| *H04J 14/02* | (2006.01) | |
| *H04B 10/25* | (2013.01) | |
| *H04B 10/112* | (2013.01) | |
| *H04B 10/60* | (2013.01) | |
| *H04B 10/40* | (2013.01) | |
| *H04B 10/50* | (2013.01) | |

(52) U.S. Cl.
CPC ......... *H04B 10/11* (2013.01); *H04B 10/1123* (2013.01); *H04B 10/2503* (2013.01); *H04B 10/2581* (2013.01); *H04J 14/0227* (2013.01); *H04J 14/0278* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | |
|---|---|---|
| 5,907,652 A | 5/1999 | DiGiovanni et al. |
| 6,731,878 B1 | 5/2004 | Britz et al. |
| 7,116,911 B2 | 10/2006 | Bloom et al. |
| 7,593,641 B2 | 9/2009 | Tegge, Jr. |
| 8,582,936 B2 | 11/2013 | Ruggiero et al. |

(Continued)

FOREIGN PATENT DOCUMENTS

WO 2008037087 A1 4/2008

OTHER PUBLICATIONS

International Search Report and Written Opinion for International Application No. PCT/US2017/053193 dated Jan. 10, 2018. 12 pages.

*Primary Examiner* — Darren E Wolf
(74) *Attorney, Agent, or Firm* — Botos Churchill IP Law

(57) ABSTRACT

A free space optical communication system transmits and receives optical signals in a colorless manner using an optical circulator. The system installs the optical circulator with a single mode (SM) fiber at port 1, a double clad (DC) fiber at port 2, and a multimode (MM) fiber at port 3. The system injects a first optical signal into a core of the SM fiber. The system then routes the first optical signal at port 1, using the optical circulator, into a SM core of the DC fiber via Port 2. Further, the system injects a second optical signal into a first cladding of the DC fiber. The system then routes the second optical signal at port 2, using the optical circulator, into the MM fiber via Port 3.

9 Claims, 9 Drawing Sheets

(56) References Cited

U.S. PATENT DOCUMENTS

| | | |
|---|---|---|
| 8,971,709 B2 | 3/2015 | Liu et al. |
| 2003/0137722 A1 | 7/2003 | Nikolajsen et al. |
| 2006/0209766 A1 | 9/2006 | Britz et al. |
| 2007/0127539 A1 | 6/2007 | Wang et al. |
| 2009/0067838 A1 | 3/2009 | Chen et al. |
| 2009/0219959 A1 | 9/2009 | Murison et al. |
| 2011/0273764 A1 | 11/2011 | Goldberg |
| 2012/0154783 A1 | 6/2012 | Goldberg et al. |

OPTICAL CIRCULATOR FOR FREE SPACE OPTICAL COMMUNICATION

CROSS-REFERENCE TO RELATED APPLICATIONS

The present application is a continuation of U.S. patent application Ser. No. 15/290,153, filed Oct. 11, 2016, the disclosure of which is incorporated herein by reference.

BACKGROUND

Free space optical communications (FSOC) links are used to transmit information through free space between terminals. Optical transmitters and receivers are aligned to establish line of sight connections for the data to be transmitted and received. Often, fiber optic components, such as fiber optic amplifiers, are used. Hence, optical alignment has to be established between two optical fiber tips that are separated by, for example, a significant distance. In such a FSOC system, transmitting the optical beam from a single mode (SM) fiber may be required, so that the optical signal can propagate in Gaussian beam to ensure the focusability at the far end. A high degree of pointing accuracy may be required to ensure that the optical beam will be received.

SUMMARY

A method and system are provided for transmitting an optical signal in a SM fiber and receiving the optical signal in a multimode (MM) fiber in a colorless manner. An optical beam may be received into the MM fiber, having a larger diameter than the SM fiber, so that the pointing accuracy can be relaxed while the line of sight is still established. Furthermore, the transmitting and receiving optics are colorless. Accordingly, the transmitting and receiving wavelength(s) do not need to be predetermined. In this regard, the network has the flexibility to reconfigure the wavelength assignments, and optics need not be aligned in the free space.

A system may comprise an optical circulator having a first port, a second port, and a third port. A first fiber is coupled to the first port of the optical circulator, a second fiber is coupled to the second port of the optical circulator, and a third fiber is coupled to the third port of the optical circulator. The optical circulator is adapted to route optical signals between at least two of the coupled fibers. For example, the first fiber may be a SM fiber, the second fiber may be a DC fiber, and the third fiber may be a MM fiber. The optical circulator may be adapted to route optical signals from the SM fiber to the DC fiber, and may be further adapted to route optical signals from the DC fiber to the MM fiber. The DC fiber may be configured to transmit and receive optical signals through free space, and may be coupled to a collimator used for receiving the optical signals. In some examples, one or more transmitters are coupled to the SM fiber, and one or more receivers coupled to the MM fiber, wherein the system is configured to transmit optical signals using a first channel, and to simultaneously receive optical signals using a second channel. The one or more transmitters may comprise a tunable transmitter, or they may be input to a single mode wavelength division multiplexer. A tunable filter may be coupled between the MM fiber and the one or more receivers. The one or more receivers may comprise multiple receivers coupled to the MM fiber through a multimode wavelength division multiplexer. The system may be wavelength insensitive, and wavelengths need to be predetermined for communication with other FSOC systems.

Another aspect of the disclosure provides a platform, comprising one or more FSOC systems, each FSOC system comprising an optical circulator having a first port, a second port, and a third port, wherein the optical circulator is wavelength insensitive, a single mode fiber coupled to the first port of the optical circulator, a double clad fiber coupled to the second port of the optical circulator, and a multimode fiber coupled to the third port of the optical circulator, wherein the optical circulator is adapted to route optical signals from the single mode fiber to the double clad fiber, and wherein the optical circulator is further adapted to route optical signals from the double clad fiber to the multimode fiber. The platform may be, for example, a mobile platform. The platform may further comprise a control unit in communication with a control system, which may be adapted to adjust a position of the platform and/or provide instructions identifying which channel to use for transmission of optical signal and which channel to use for receipt of optical signals.

One aspect of the disclosure provides a method of optical communication by a first terminal, comprising injecting a first optical signal into a core of a single mode fiber coupled to a first port of an optical circulator, routing, using the optical circulator, the first optical signal into a core of a double clad fiber, the double clad fiber being coupled to a second port of the optical circulator, and transmitting the first optical signal through free space to a second terminal. In some examples, the method further comprises injecting a second optical signal into a first cladding of the double clad fiber, and routing, using the optical circulator, the second optical signal into a multimode fiber at a third port of the optical circulator. The first optical signal may be amplified prior to routing the first optical signal to the double clad fiber. For example, a single mode wavelength division multiplexer may amplify two bands of optical signals input thereto. Transmitting the first optical signal through free space may include transmitting the first optical signal on a first channel, and in this regard the method may further include receiving, by the double clad fiber, a second optical signal through free space from the second terminal on a second channel simultaneously with the transmitting. Further, a bi-directional optical link with the second terminal may be maintained, such that by switching channels, a third optical signal can be transmitted on the second channel and a fourth optical signal can be received on the first channel, without breaking the bi-directional optical link.

DETAILED DESCRIPTION

The systems and techniques described herein relate to a FSOC system having an optical circulator installed within a SM fiber, a double clad (DC) fiber, and a MM fiber. The system can be implemented for use in any of a variety of environments. For example, the system can be implemented locally on a client device or implemented across a client device and server environment. The client device can be any communication device such as an optical communication device, optical transmitters, optical receivers, or FSOC base stations, etc. In one particular example, the system may be implemented in a high-altitude platform, such as an aircraft, an unmanned aerial vehicle (UAV), a balloon, a satellite, etc., and may be used to communicate with other high-altitude platforms or grounded devices.

Figure 1:
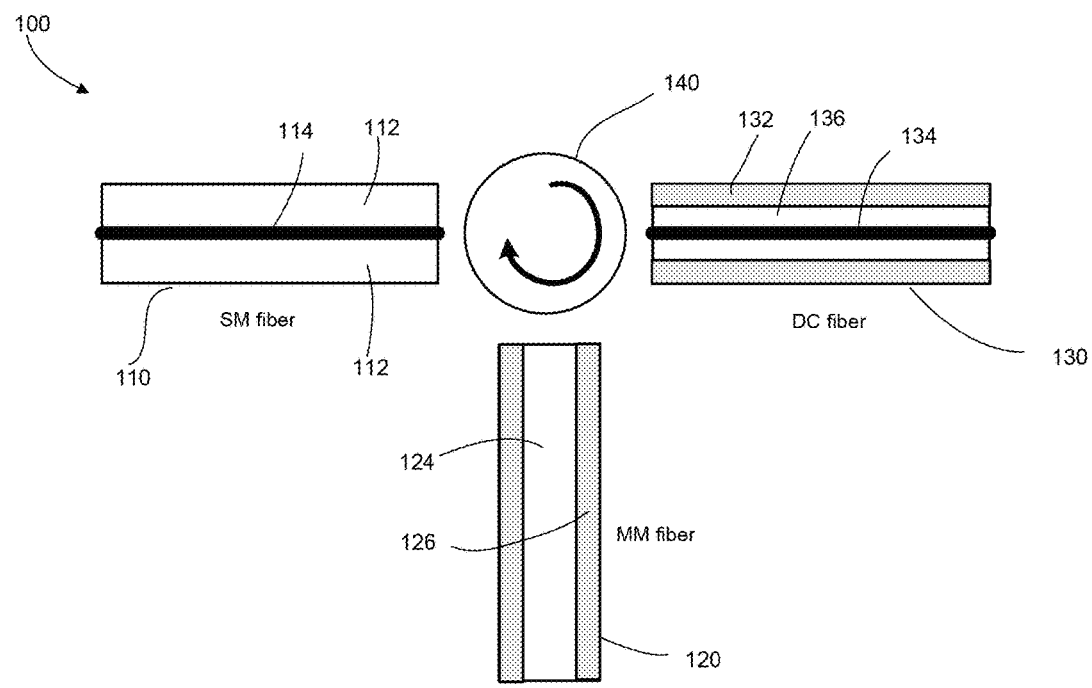
FIG. 1 illustrates an example fiber pigtailed optical circulator used in an FSOC system according to aspects of the disclosure.

FIG. 1 illustrates an example fiber coupled optical circulator system 100, including a SM fiber 110, a MM fiber 120, and a DC fiber 130 each in communication with an optical circulator 140. For example, each of the SM fiber 110, MM fiber 120, and DC fiber 130 can be fiber pigtailed with the optical circulator 140. In fiber optics, an optical signal is guided down the center of a fiber called the core. The core is surrounded by a cladding, which is an optical material that traps the light in the core using at least one of an optical technique. For example, the cladding may trap the light via total internal reflection.

The SM fiber 110 includes a core 114 and cladding 112. The SM fiber 110 is designed to support one transverse mode, carrying light parallel to a length of the fiber. The light may have different frequencies. A core diameter of the SM fiber may be relatively small, for example between 8 and 10.5 μm, with a cladding diameter of approximately 125 μm. It should be understood that these dimensions are merely examples, and that other dimensions may be used. In some examples, the SM fiber may be chemically or physically altered to have special properties.

The MM fiber 120 includes a core 124 and cladding 126. The MM fiber 120 has a larger core diameter than the SM fiber 110. By way of example only, the core diameter of the MM fiber 120 may be approximately 50-100 μm. Accordingly, the MM fiber 120 may support more than one propagation mode.

The DC fiber 130 may include multiple layers of optical material, such as a core, an inner cladding, and an outer cladding. For example, the DC fiber 130 has the SM core 134 that is surrounded by a first cladding 132 to support the SM optical guiding. The first cladding 132 is surrounded by a second cladding 136. In this example, the first cladding 132 itself is a MM optical waveguide, which may match with the MM fiber 120 for low coupling loss.

The optical circulator 140 is a fiber optic component that can be used to direct optical signals. The circulator 140 may have multiple ports for coupling to multiple fibers. For example, as shown in FIG. 1, the optical circulator 140 is pigtailed with the fibers 110-130, such that the SM fiber 110 is coupled to a first port, the DC fiber 130 is coupled to a second port, and the MM fiber 120 is coupled to a third port. Accordingly, optical signals received at a fiber at one port may be directed to another fiber at another port.

The example arrangement of fibers and ports described above and herein may be varied. For example, the SM fiber 110, MM fiber 120, and DC fiber 130 may be fiber coupled to different ports of the optical circulator 140. As a further example, different types of fibers may be used.

Figure 2:
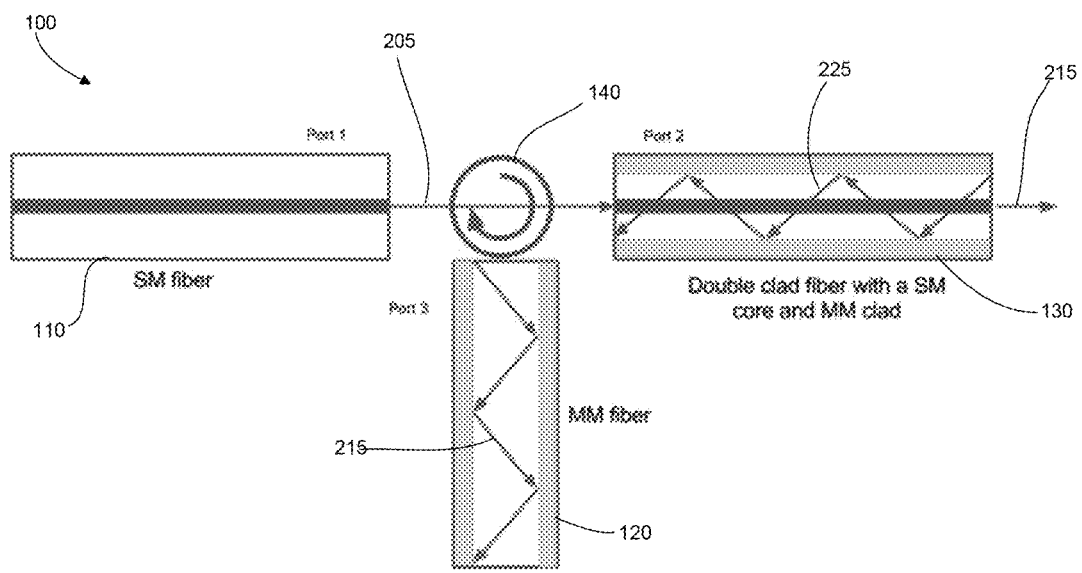
FIG. 2 illustrates an example operation of the fiber pigtailed optical circulator system of FIG. 1.

FIG. 2 provides an example of how to use the fiber pigtailed circulator 100 in an FSOC system. A first optical signal 205 is injected into the core of the SM fiber 110. The first optical signal 205 from port 1 is routed by the optical circulator 140 to the SM core of port 2, which then exits the optical circulator as a transmitting signal 215. The first optical signal may thus be transmitted to a second FSOC system (not shown).

A second optical signal 225 is received, for example from the second FSOC system, into the first cladding of the DC fiber 130 which acts as a MM waveguide. The second optical signal 225 from port 2 is then routed to port 3 which is pigtailed with the MM fiber 120.

The FSOC system of FIG. 2 is not wavelength selective. Accordingly, in transmitting and receiving optical signals between the FSOC system of FIG. 2 and another FSOC system, a wavelength of the transmitted or received signals does not need to be predetermined. Rather, any wavelength may be sent or received.

Figure 3:
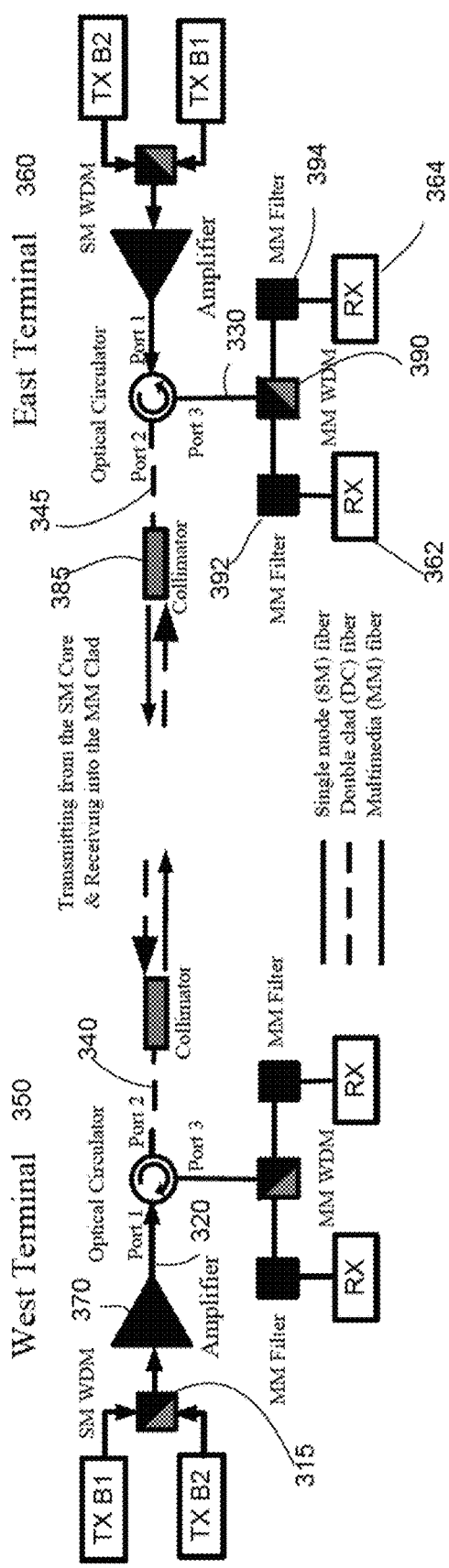
FIG. 3 illustrates an example communication between two FSOC systems according to aspects of the disclosure.

FIG. 3 illustrates how an optical circulator is used in the FSOC system to transmit an optical signal from a SM fiber 320 and to receive the optical signal into a MM fiber. A system architecture has two terminals, a west terminal 350 and an east terminal 360. Each terminal has a transmitter ($TX_{West}$ and $TX_{East}$, respectively) and each transmitter may include one or multiple optical channels, illustrated as bands TX B1 and TX B2. A SM wavelength division multiplexer (WDM) 315 at $TX_{West}$ combines these two channels or bands of optical signals into an optional optical amplifier 370. The output of the amplifier is connected to port 1 of the optical circulator and is routed to the SM core of a DC fiber 340 of Port 2. In this example, west terminal 350 transmits on a first channel.

The optical signal is then propagated in the free space to the east terminal 360 and received into the first cladding of a DC fiber 345 which is a MM optical waveguide. In some examples, focusing optics, such as a collimator 385, may be used in receiving the optical signal at the east terminal 360. For example the collimator 385 may help to narrow a beam of the received signal prior to receipt by the DC fiber 245, such that the DC fiber 345 receives a narrower beam (e.g., having a better alignment of rays or a narrower cross section). Afocal telescopes may be used conjunction with the fiber pigtailed collimators to expand the optical beam for providing optical antenna gain, so that the optical loss between the transmitter and the receiver is reduced. Beam pointing, tracking and acquisition schemes may also be used to establish the line of sight connection between these two terminals. This received signal is then routed to the Port 3 MM fiber 330 of the circulator and is received by the receiver. With this arrangement, transmitting from SM fiber 320 and receiving into MM fiber 330 is realized.

Just as the west terminal 350 can transmit on one or more channels, the east terminal 360 can receive on one or more channels. Depending on the link loss between the east and west terminals, the transmitting power could be much higher than the receiving power. As a result, if there is any leakage or crosstalk from the transmitter to the receiver through the circulator and the collimator of the same terminal, the receiving signal is contaminated by this crosstalk. To resolve this issue, Port 3 of the circulator is followed by a MM WDM 390 to separate the wavelength bands of the two channels. In some examples, the MMWDM 390 may be a dense WDM (DWDM), or it may be followed by a DWDM to separate the receiving channels into multiple fibers if there are multiple transmitting wavelengths in the transmitting channel MM bandpass filters 392, 394 can be placed between the MM WDM 390 and receivers 362, 364. When a terminal is transmitting in a certain wavelength band, the receiver assigned with the same wavelength band can be set in the idle mode electronically and only the receiver assigned with the opposite wavelength band is used to receive the signals from the far end terminal. Thus, in this example the west terminal transmits on the first channel and the east terminal receives on the first channel, while the east terminal 360 transmits on a second channel and the west terminal receives on the second channel. However, in other examples the channels may be varied. Further, in other example systems more than two channels may be available.

Because the circulator is wavelength insensitive, the whole architecture is colorless in the sense that the east terminal 360 and the west terminal 350 can switch the transmitting and the receiving wavelengths without breaking the bidirectional optical link. Other wavelength management devices, such as wavelength division multiplexers and/or demultiplexers, as well as optical filters may be used to enhance the optical signal integrity or to increase the flexibility of the optical channel planning.

Figure 4:
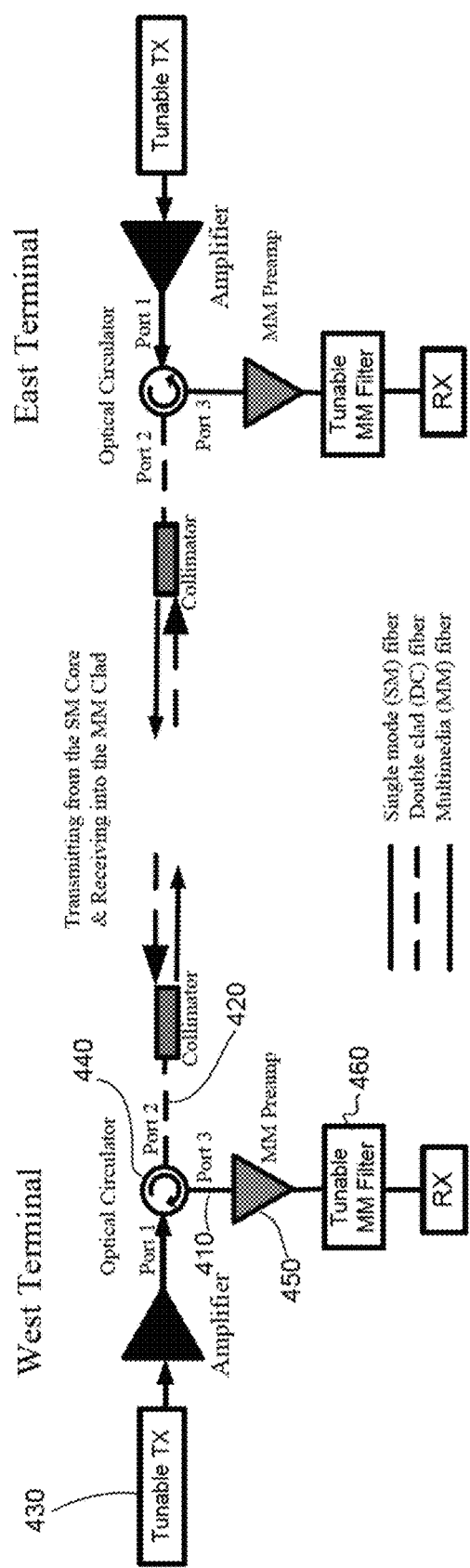
FIG. 4 illustrates another example communication between two FSOC systems according to aspects of the disclosure.

FIG. 4 illustrates an alternative architecture of FIG. 3. As illustrated in FIG. 4, an optional MM optical preamp 450 is used to increase the receiving sensitivity. Because the receiving path is in MM fibers 410 via the first clad of the DC fiber 420 and the MM fiber 410 of the Port 3 of the circulator 440, the preamp in the receiving path is illustrated as a MM optical preamp 450. Also as in FIG. 4, a tunable transmitter 430 can be used in both terminals. A tunable transmitter 430 can include one wavelength or multiple independently modulated laser wavelengths. Furthermore, a MM tunable bandpass filter 460 can be used to select certain wavelength band(s). The receiver (RX) may be a single photodiode or multiple spectrally separated photodiodes.

Figure 5:
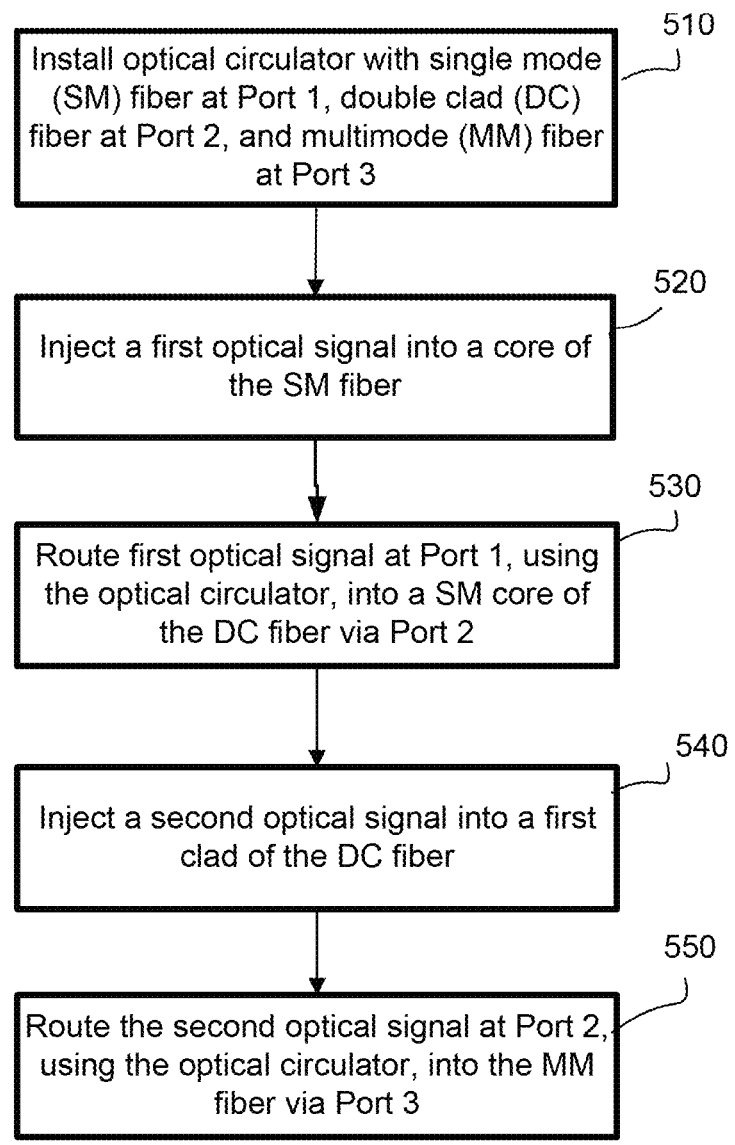
FIG. 5 is a block diagram of an example platform including the fiber pigtailed optical circulator system of FIG. 1.

FIG. 5 illustrates an example method 500 for transmitting and receiving an optical signal using an optical circulator in a colorless manner Method 500 can be performed by, for example, the FSOC system of the present disclosure.

In block 510, the system installs an optical circulator with a single mode (SM) fiber at port 1, a double clad (DC) fiber at port 2, and a multimode (MM) fiber at port 3. This arrangement of the fibers is merely an example, and other arrangements of the fibers in relation to the ports of the optical circulator are possible.

In block 520, the system injects a first optical signal into a core of the SM fiber. The first optical signal may be generated by, for example, a transmitter in response to commands from one or more processors. In some examples, the first optical signal may be amplified prior to injection into the SM fiber.

In block 530, the system routes the first optical signal at port 1, using the optical circulator, into a SM core of the DC fiber via Port 2.

In block 540, the system injects a second optical signal into a first cladding of the DC fiber. The second optical signal may be received from, for example, a second FSOC system.

In block 550, the system routes the second optical signal at port 2, using the optical circulator, into the MM fiber via Port 3. Hence, the second optical signal acts as a received signal in the MM fiber. The optical circulator is not wavelength sensitive, as a result, and promotes colorless transmitting from an SM fiber and receiving into an MM fiber.

As mentioned above, the FSOC system may be used in connection with one or more computing devices on a platform. The platform may be a grounded platform, such as a controller, base station, or any other computing device. The platform may alternatively be a mobile platform, such as a car, buoy, laptop computer, etc. In further examples, the platform may be a high-altitude platform, such as a drone, satellite, balloon, or the like.

Figure 6:
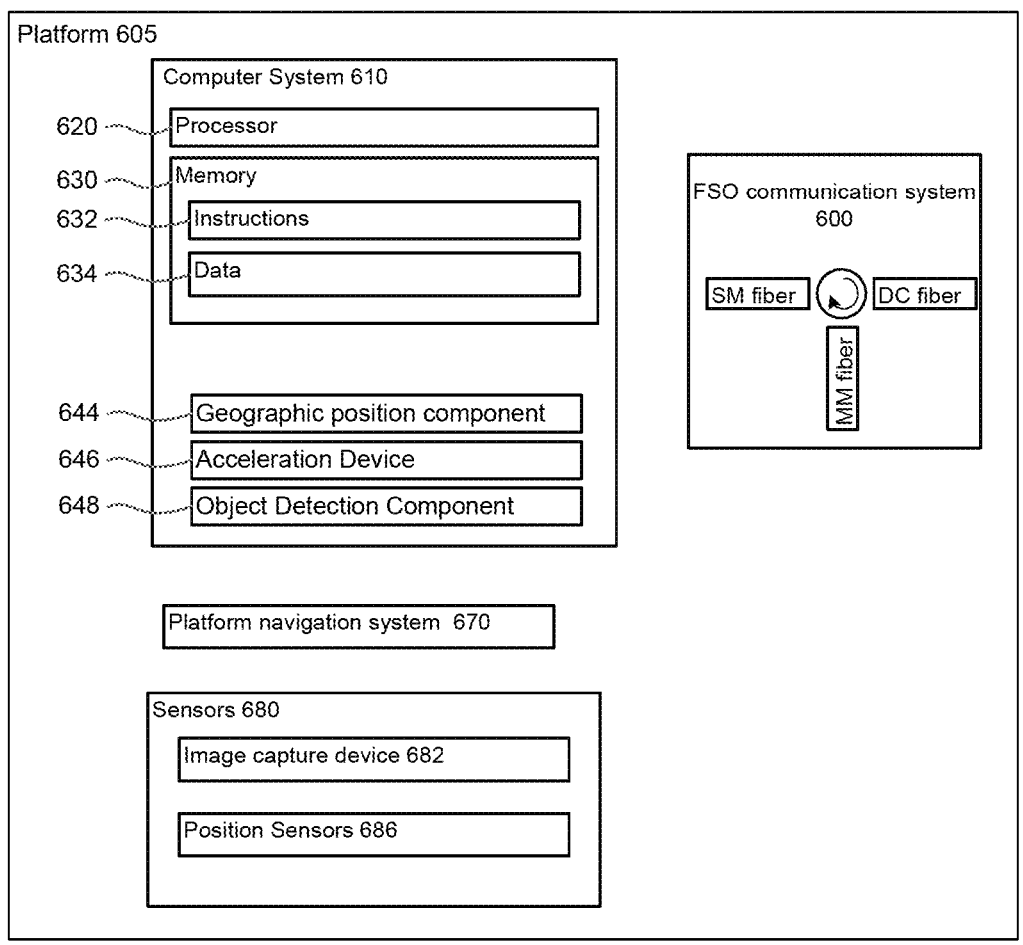
FIG. 6 is a flow diagram illustrating an example method according to aspects of the disclosure.

FIG. 6 is a block diagram illustrating an example platform 605, including various components. The platform may have one or more computers, such as computer 610 containing a processor 620, memory 630 and other components typically present in general purpose computers. The one or more computers may be in communication with a FSOC system 600, which includes an optical circulator coupled to a SM fiber, MM fiber, and DC fiber as described in the examples above.

The memory 630 stores information accessible by processor 620, including instructions 632 and data 634 that may be executed or otherwise used by the processor 620. The memory 630 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 632 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 634 may be retrieved, stored or modified by processor 620 in accordance with the instructions 632. For instance, although the system and method is not limited by any particular data structure, the data may be stored in computer registers, in a relational database as a table having a plurality of different fields and records, XML documents or flat files. The data may also be formatted in any computer-readable format. The data may comprise any information, such as numbers, descriptive text, proprietary codes, references to data stored in other areas of the same memory or different memories (including other network locations) or information that is used by a function to calculate the relevant data.

The processor 620 may be any conventional processor, such as processors from Intel Corporation or Advanced Micro Devices. Alternatively, the processor may be a dedicated device such as an ASIC. Although FIG. 6 functionally illustrates the processor, memory, and other elements of computer 610 as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

Computer 610 may include all of the components normally used in connection with a computer such as a central processing unit (CPU), graphics processing unit (GPU), memory (e.g., RAM and internal hard drives) storing data 634 and instructions such as a web browser, an electronic display (e.g., a monitor having a screen, a small LCD touch-screen or any other electrical device that is operable to display information), and user input (e.g., a keyboard, touch-screen and/or microphone).

Computer 610 may also include a geographic position component 644 to determine the geographic location of the platform 605. For example, computer 610 may include a GPS receiver to determine the platform's latitude, longitude and/or altitude position. Other location systems such as laser-based localization systems, inertial-aided GPS, or camera-based localization may also be used.

Computer 610 may also include other features, such as an accelerometer, gyroscope or other acceleration device 646 to determine the direction in which the device is oriented. By way of example only, the acceleration device may determine its pitch, yaw or roll (or changes thereto) relative to the direction of gravity or a plane perpendicular thereto. In that regard, it will be understood that a computer's provision of location and orientation data as set forth herein may be provided automatically to the user, other computers of the network, or both.

Computer 610 may also include an object detection component 648 to detect and identify objects, such as other platforms, birds, power lines, utility poles, or other obstructions. The detection system may include lasers, sonar, radar, cameras or any other such detection methods. In use, computer 610 may use this information to instruct the navigation system 370 to update a position of the platform 605.

Computer 610 may send and receive information from the various systems of platform 605, for example the navigation 670 system in order to control the movement, speed, etc. of platform 605. In some examples, such information may be received at the computer from another entity, such as a wireless ground controller. For example, computer 610 may be capable of communicating with a remote server or other computer (not shown) configured similarly to computer 610, with a processor, memory, instructions, and data. The remote server or other computer may receive position information and/or other information from the sensors 680 and/or FSOC system 600. In other examples, such information may be determined by the computer 610 based on information detected by sensors 680 or other components of the platform 605.

It will be understood that although various systems and computer 610 are shown within platform 605, these elements may be external to platform 605 or physically separated.

Figure 7:
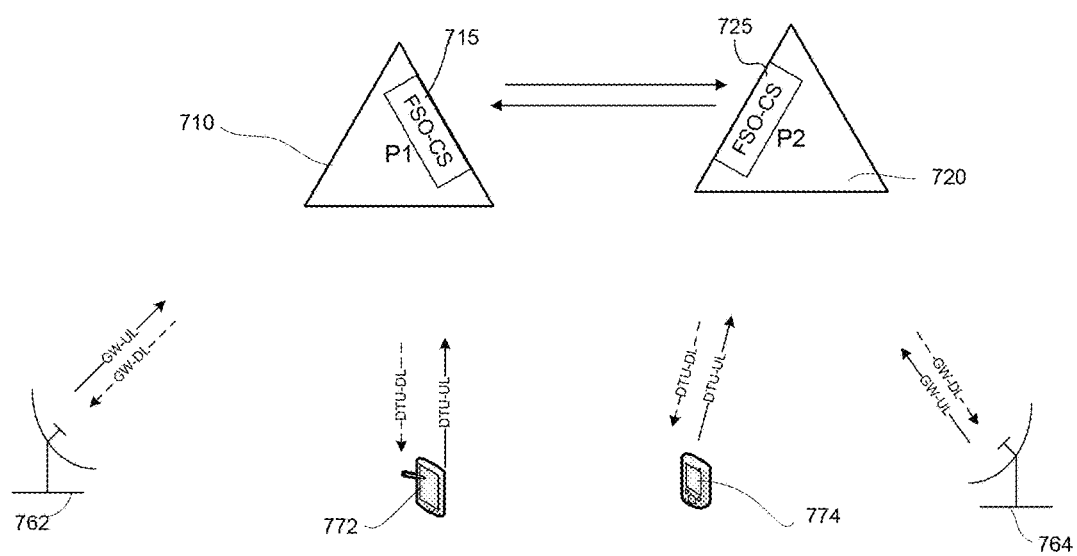
FIG. 7 is a pictorial diagram illustrating an example communication between two platforms including FSOC systems according to aspects of the disclosure.

FIG. 7 illustrates an example network including communication between and among two platforms and one or more ground terminals. As shown, a first platform 710 includes FSOC system 715, and a second platform 720 includes FSOC system 725. Each of the FSOC systems 715, 725 may include an optical circulator coupled to optical fibers as described in the examples above. In this regard, the FSOC systems 715, 725 may transmit and receive optical signals therebetween, and thus send data and other information between the platforms 710, 720.

As further illustrated in FIG. 7, one or more ground terminals may also communicate directly with the platforms 710, 720, either through the FSOC systems 715, 725 or through other communication devices on the platforms 710, 720. For example, ground terminals 762, 764 may be positioned at ground level, on top of buildings, or the like. The ground terminals 762, 764 may communicate with the platforms 710, 720, respectively, through gateway uplinks (GW-UL) and gateway downlinks (GW-DL). In other examples, the ground terminals may include optical systems capable of optical communication with the FSOC systems 715, 725. Similarly, mobile devices such as tablet 772 and smartphone 774 may also directly communicate with the platforms 710, 720, through direct-to-user (DTU) uplinks or downlinks or optical signals.

Figure 8:
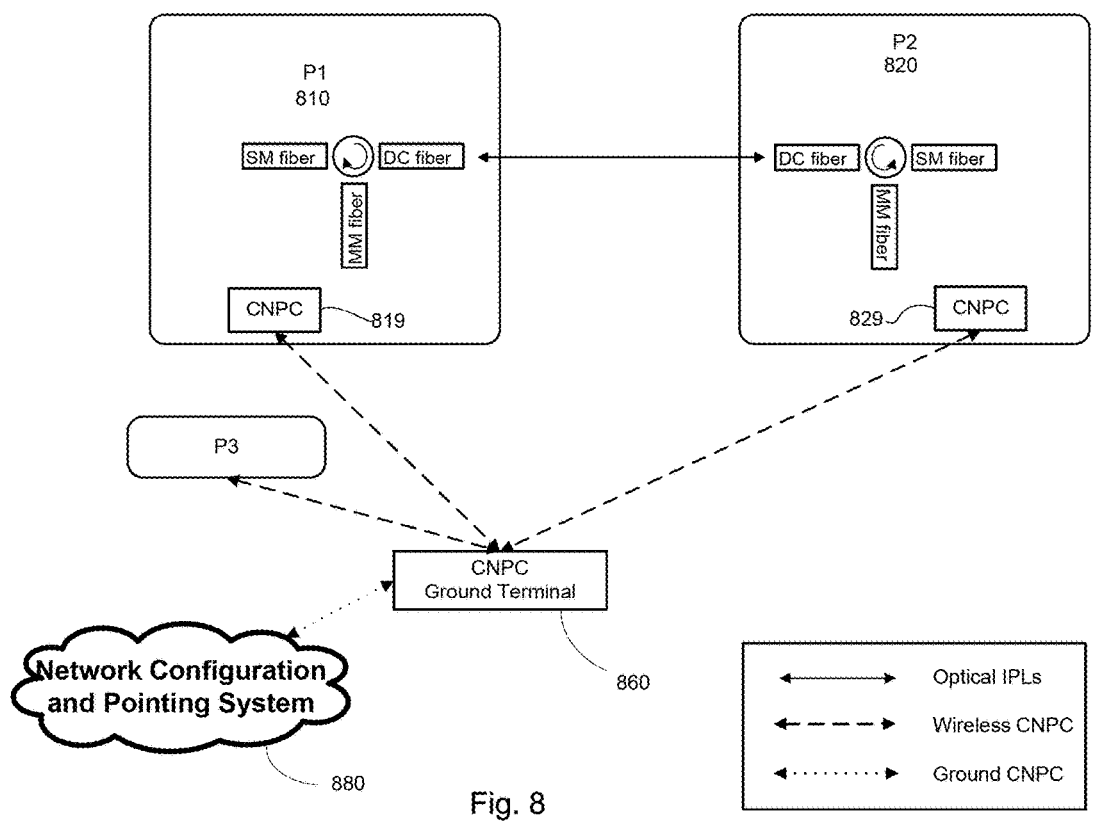
FIG. 8 is another example of communications among platforms and other entities according to aspects of the disclosure.

FIG. 8 is another example of communications among platforms and other entities. In addition to each platform 810, 820 including a FSOC system, each platform 810, 820 may further include a control-and-non-payload communication (CNPC) unit, such as CNPC units 819, 829. The CNPC units 819, 829 may include transceivers capable of wireless communication with CNPC ground terminal 860. For example, the CNPC units 819, 829 and ground terminal 960 may communicate via radio. The CNPC ground terminal 860 may further communicate with a network configuration and pointing system 880, for example, via a wired link. In this regard, the network configuration and pointing system 860 may provide information to the platforms 810, 820 through the CNPC ground terminal 860. Such information may include, by way of example only, positioning information. Such positioning information may be used to adjust an alignment of components in the FSOC system, such that optical signals sent by one platform are accurately received by the other. According to other examples, such information provided through the CNPC may include instructions regarding which channels to use for transmission of optical signals and which channels to use for receipt of optical signals.

Figure 9:
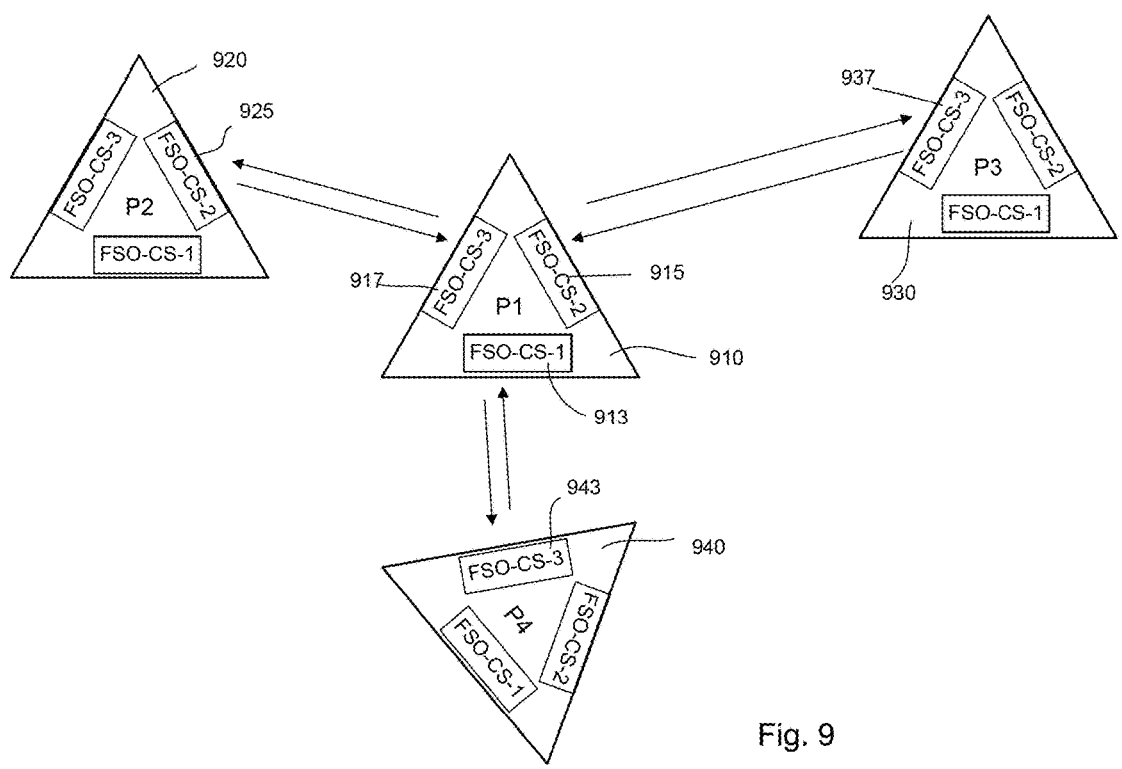
FIG. 9 is an example diagram illustrating communication among platforms including multiple FSOC systems according to aspects of the disclosure.

FIG. 9 is an example diagram illustrating communication among platforms including multiple FSOC systems. For example, platform 910 includes three FSOC systems 913, 915, 917. Each of these FSOC systems 913, 915, 917 may communicate with another FSOC system on another platform. For example, as shown, the FSOC system 813 communicates with FSOC system 843 on platform 940, FSOC system 915 communicates with FSOC system 937 on platform 930, and FSOC system 917 communicated with FSOC system 925 on platform 920. Accordingly, one platform may conduct optical communications with multiple other platforms simultaneously.

The techniques described above may also be used in a Lidar system. For example, the first optical signal may be the transmitted signal, consisting of optical pulses, and the second optical signal is the reflected signal from an object of interest.

The subject matter described herein can be implemented in software and/or hardware (for example, computers, circuits, or processors). The subject matter can be implemented on a single device or across multiple devices (for example, a client device and a server device). Devices implementing the subject matter can be connected through a wired and/or wireless network. Specific examples disclosed are provided for illustrative purposes and do not limit the scope of the disclosure.

Moreover, an arrangement of fibers or types of fibers used with the optical circulator may be varied.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
   an optical circulator having a first port, a second port, and a third port;
   a single mode fiber coupled to the first port of the optical circulator;
   a double clad fiber coupled to the second port of the optical circulator; and
   a multimode fiber coupled to the third port of the optical circulator;
   a transmitter coupled to the single mode fiber, the transmitter transmitting first optical signals using a first channel, wherein the transmitter comprises a tunable transmitter;
   a receiver coupled to the multimode fiber, the receiver receiving second optical signals using a second channel simultaneously with the transmitting by the transmitters; and
   a multimode tunable filter coupled between the multimode fiber and the receiver;
   wherein the optical circulator routes the first or second optical signals among the single mode, double clad, and multimode fibers.

2. The system of claim 1, wherein the optical circulator is adapted to route optical signals from the single mode fiber to the double clad fiber, and wherein the optical circulator is further adapted to route optical signals from the double clad fiber to the multimode fiber.

3. The system of claim 1, wherein the system is wavelength insensitive.

4. The system of claim 1, further comprising a collimator coupled to the double clad fiber, wherein the double clad fiber is configured to transmit the optical signals through free space, and to receive optical signals through free space.

5. A platform, comprising:
   one or more free space optical communication (FSOC) systems, each FSOC system comprising:
      an optical circulator having a first port, a second port, and a third port;
      a single mode fiber coupled to the first port of the optical circulator;
      a double clad fiber coupled to the second port of the optical circulator; and
      a multimode fiber coupled to the third port of the optical circulator;
      a transmitter coupled to the single mode fiber, the transmitter transmitting first optical signals using a first channel, wherein the transmitter comprises a tunable transmitter;
      a receiver coupled to the multimode fiber, the receiver receiving second optical signals using a second channel simultaneously with the transmitting by the transmitters; and
      a multimode tunable filter coupled between the multimode fiber and the receiver;
      wherein the optical circulator is adapted to route at least one of the first or second optical signals from the single mode fiber to the double clad fiber, and wherein the optical circulator is further adapted to route at least one of the first or second optical signals from the double clad fiber to the multimode fiber; and
   a computing device in communication with the one or more FSOC systems, the computing device including one or more processors configured to control at least one of operation of the one or more FSOC systems or movement of the platform.

6. The platform of claim 5, further comprising a navigation system configured to control movement of the platform.

7. The platform of claim 5, further comprising a control unit in communication with the computing device, the control unit configured to adjust a position of the platform.

8. The platform of claim 5, further comprising a control unit in communication with the computing device, the control unit configured to provide instructions identifying which channel to use for transmission of optical signals and which channel to use for receipt of optical signals.

9. The platform of claim 5, wherein each FSOC system is wavelength insensitive.

* * * * *